United States Patent [19]

Pulliam

[11] 4,279,263

[45] Jul. 21, 1981

[54] CLEANING APPARATUS

[76] Inventor: William D. Pulliam, 15710 Rosalita Dr., La Mirada, Calif. 90638

[21] Appl. No.: 100,369

[22] Filed: Dec. 5, 1979

[51] Int. Cl.³ .............................. B08B 3/02; B60S 3/04
[52] U.S. Cl. .................................... 134/111; 134/113; 134/123; 134/200; 239/286
[58] Field of Search ................. 134/45, 111, 113, 123, 134/200; 239/286, 304, 310

[56] References Cited

U.S. PATENT DOCUMENTS

| | | | |
|---|---|---|---|
| 2,619,099 | 11/1952 | Young | 134/111 X |
| 2,981,266 | 4/1961 | Tamburri | 134/123 X |
| 2,997,048 | 8/1961 | Gertken et al. | 134/123 X |
| 3,258,019 | 6/1966 | Bellas et al. | 134/123 X |
| 3,289,238 | 12/1966 | Sorenson et al. | 134/123 X |
| 3,353,546 | 11/1967 | Mahoney | 134/123 |
| 3,416,544 | 12/1968 | Paiva | 134/111 X |
| 3,444,867 | 5/1969 | Thornton | 134/123 |
| 3,522,814 | 8/1970 | Olson | 134/113 X |
| 3,698,029 | 10/1972 | Pulliam | 134/123 X |

FOREIGN PATENT DOCUMENTS 1346639 11/1963 France .................................. 134/123

Primary Examiner—Robert L. Bleutge
Attorney, Agent, or Firm—George J. Netter

[57] ABSTRACT

An upstanding generally rectangular enclosure is received upon a wheeled base via which it can be readily moved to any desired location and position in any desired orientation. A wall of the enclosure is hinged at its bottom edge forming a door that may be swung downwardly and outwardly to rest on a ground plane. Pedestal means hold the door canted to the horizontal. The door includes a foldable extension which forms a ramp to the ground plane. A second ramp extends from the door outer end inwardly onto the door. Peripheral edge walls form a shallow pan on the door. A pipe frame holds flexible wall members about the sides and back. The interior of the enclosure includes a tank of a cleaning liquid (e.g., water), a heater, a pump connected to the tank and a length of hose with nozzle via which heated cleaning liquid is emitted. A further pump communicates with the door pan for pumping fluids therein through a filtering system and into a storage tank within the enclosure.

8 Claims, 4 Drawing Figures

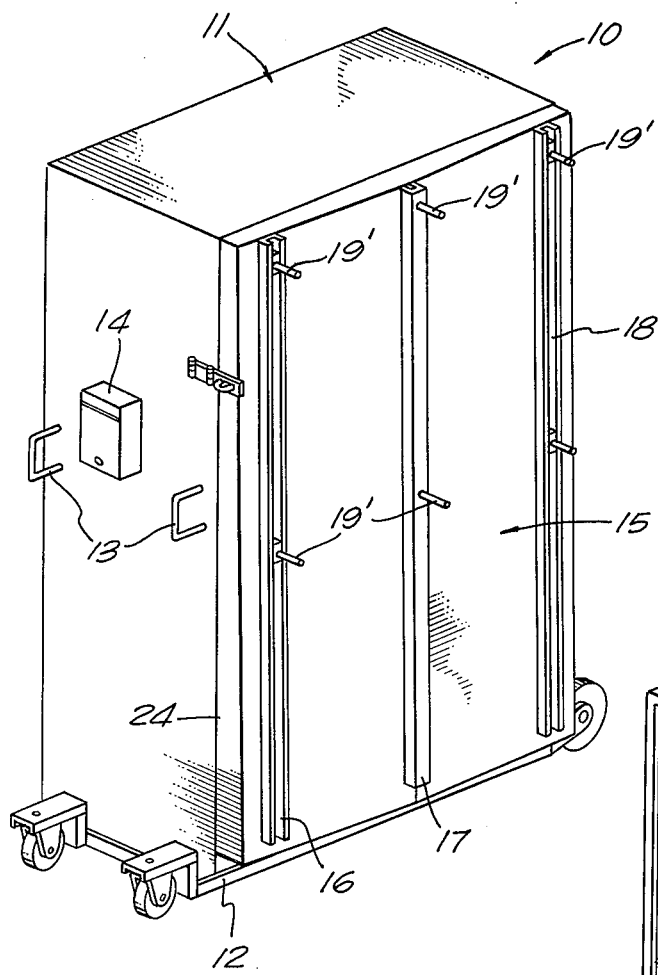
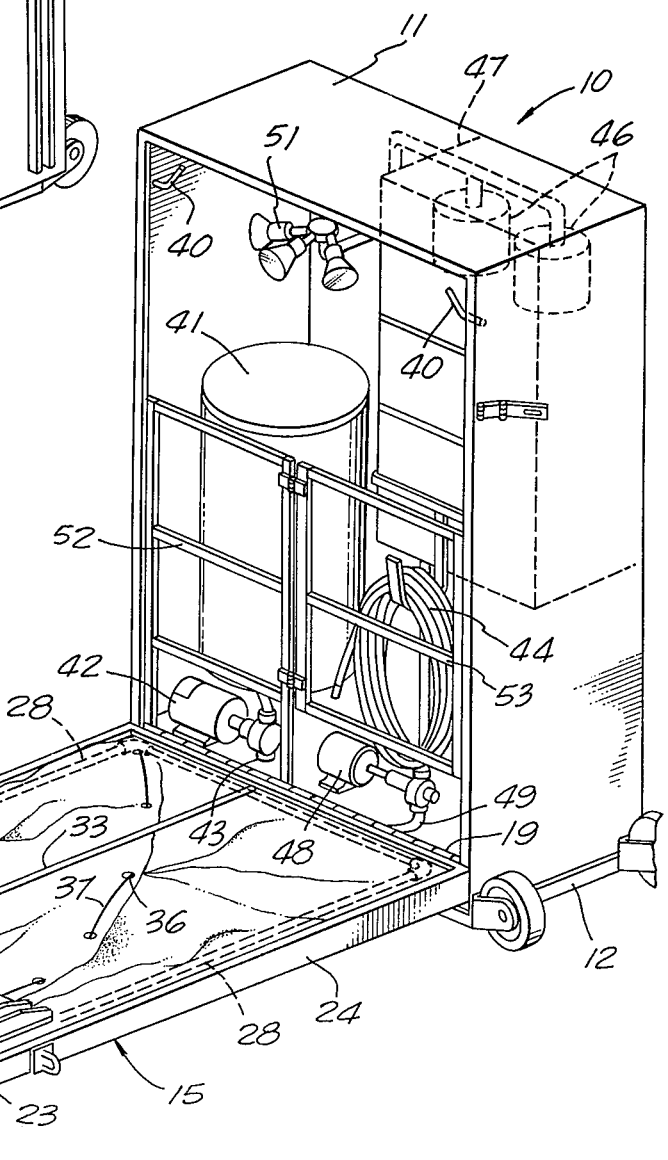

CLEANING APPARATUS

The present invention relates generally to cleaning apparatus, and, more particularly, to apparatus for cleaning such things as meat utensils, market baskets or the like, which is portable and collapsible into a compact form for transportation or storage, and which recycles and retains the cleaning materials for subsequent disposal in a non-polluting manner.

BACKGROUND OF THE INVENTION

There are many instances in which articles require frequent cleaning and where the cleaning materials used are difficult, inconvenient, or severely restricted by law in the manner of disposal. For example, more and more communities are restricting by local ordinances the disposal of cleaning materials either fluid or solid, and forbid their being emptied into drainage or sewage facilities. These restrictions apply in many cases, even to the disposal of such seemingly innocuous cleaning substances as detergents. For example, there are Federal regulations prohibiting open disposal of materials having a pH lying without the range 6-9.5.

In supermarkets, for example, common items of use are market baskets which are wheeled vehicles including wire-like baskets mounted thereon for carrying goods, and which are pushed through the facility by the customer. Such market baskets require frequent cleaning and desirably must be cleaned on or closely adjacent the actual use facility in order to keep the cost of such cleaning within practical limits. Also, racks, utensil and the like used in meat departments require daily cleaning.

SUMMARY OF THE INVENTION

In the practice of the present invention, there is provided an upstanding generally rectangular enclosure received upon a wheeled base via which it can be readily moved to any desired location and position in any desired orientation. A side wall of the enclosure is hinged at its bottom edge forming a door that may be swung downwardly and outwardly to rest on a ground plane. Pedestal means are so arranged that the hinged wall or door will be canted somewhat from the horizontal with its outermost end slightly higher from the ground plane than those parts adjacent the hinge. The outermost end of the door or wall also includes a foldable extension which when extended provides a ramp from the outer end of the door downwardly to the ground plane. A second ramp extends from the door outer end inwardly onto the door. The upwardly directed surface of the door-wall includes upstanding peripheral edge walls forming a shallow pan defining the cleaning area.

A pipe frame is connected to the open inside surface of the door when it is extended and onto which frame side and back flexible wall members are provided extending completely about the lowered door, with the outer end and top being left optionally open or closed.

The interior of the closure includes a tank of a cleaning liquid (e.g., water), means for heating the liquid, a pump connected to the tank and a length of hose with nozzle thereof via which heated cleaning liquid is emitted as a spray or stream. A further pumping means is in communication with the pan formed by the lower door for pumping fluids therein through a filtering system and into a storage tank, all within the enclosure.

In use, the apparatus is wheeled to the location desired and interconnected with a local source of electrical power. The door-wall is swung away from the enclosure to a ground plane supported position. The frame and flexible walls are erected and items to be cleaned are moved into the pan. Cleaning liquid is sprayed onto the market baskets and the liquid is collected in the pan. Excess cleaning liquid is pumped to the filter and stored for later use.

DESCRIPTION OF THE DRAWING

FIG. 1 is a perspective view of the cleaning apparatus of this invention assembled for transportation or storage.

FIG. 2 is a perspective view showing the apparatus in an interim stage preparatory to use.

DESCRIPTION OF A PREFERRED EMBODIMENT

Figure 3:
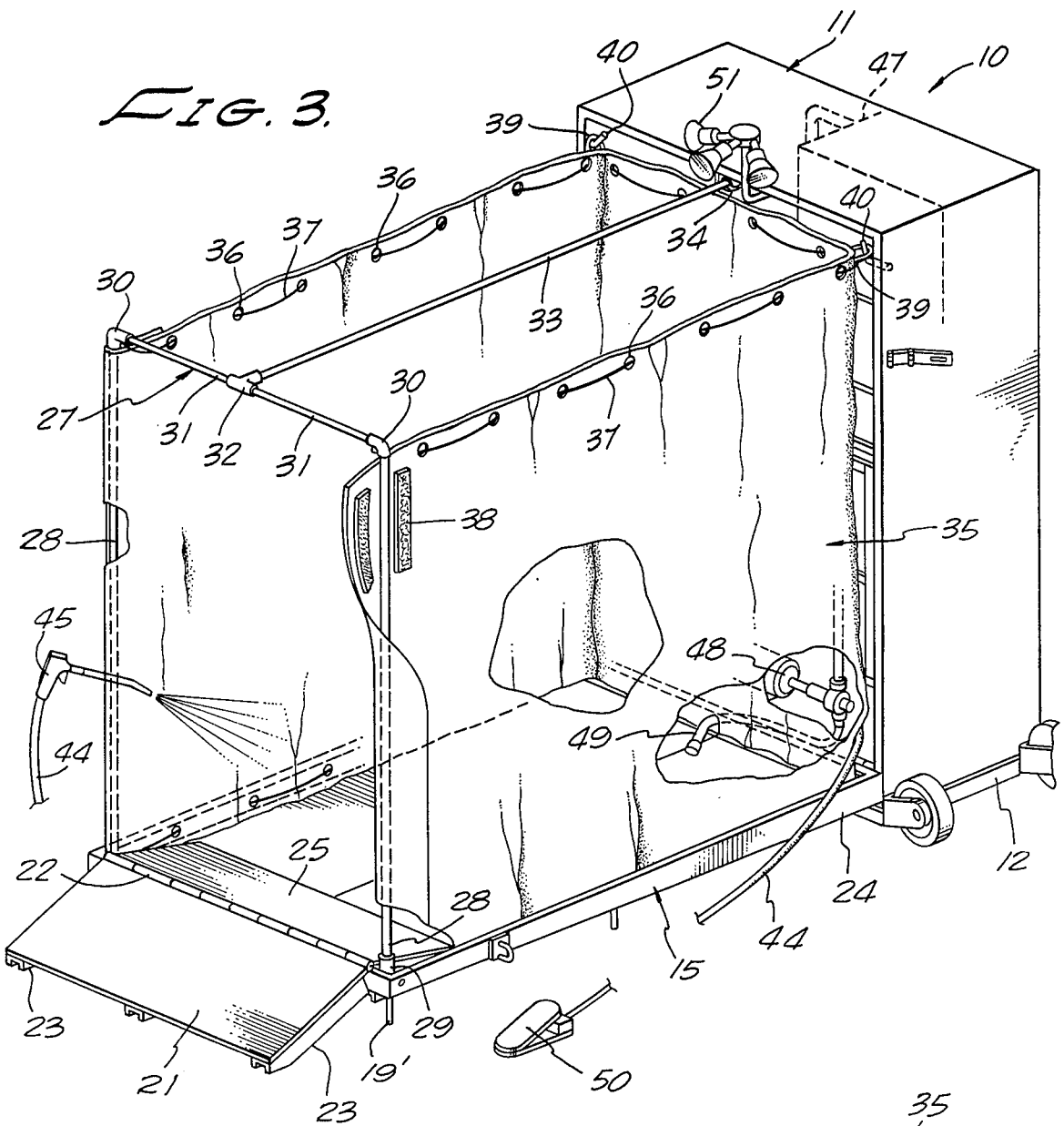
FIG. 3 is a perspective view of the apparatus shown in use.

With reference now to the drawing, and particularly FIG. 1, the cleaning apparatus of this invention is identified generally as at 10 and is seen to include a substantially rectangular enclosure 11 supported on a wheeled base 12. A pair of hand grips 13 are located about midway on one side wall via which a user of the equipment may move the enclosure 11 to any desired location or change its orientation as needed. An electrical junction box 14 is conveniently located on the same wall as that including the grips 13 and is used in the conventional manner to interconnect external electrical power to internally located equipment to be described.

A side wall 15 of the enclosure is seen to include three channel stiffeners or reinforcing means 16, 17 and 18 affixed thereto and extending generally vertically along both wall peripheral edges and substantially the centerline. The wall 15 is connected to bottom wall of the enclosure by a hinge 19 enabling the wall to be swung out and at substantially ninety degrees to the remainder of the enclosure as shown in FIG. 2. A plurality of rod-like pedestals 19 extend outwardly of the channels 16–18 for supporting the wall 15 on the ground plane 20. The outer end of the wall 15 includes an extendible end member 21 which forms an inclined ramp between the wall and the ground plane as can be seen best in FIG. 4. Specifically, the member 21 consists of a flat plate interconnected to the door end by a hinge 22 and also has reinforcing channels 23 which are aligned with channels 16–18 of the wall 15.

A continuous upstanding wall 24 is affixed to the peripheral edge of the door or wall 15 forming a shallow panlike region on the upwardly directed surface of the wall in which cleaning liquid and other material is collected during use of the described apparatus.

A further ramp consisting of a rectangular plate 25, is affixed via a hinge 26 to the same end wall to which the hinge 22 is connected only facing inwardly towards the panlike region of the door or wall. The ramps 21 and 25 cooperate to permit a shopping basket to be moved up and into the panlike region with a minimum of effort.

Turning now to FIG. 3, a framework 27 is constructed of a plurality of pipe members interfitted by suitable threaded joints and nipples, or, alternatively, weldments. More particularly, pipe members 28 of identical length each have one end received in respective nipples 29 located on the outer corners of the door panlike region. The upper ends of the members 28 are threaded (or welded) into elbow joints 30. Further pipe members 31 extend from the elbow joints 30 and are secured to a centrally located T-section 32. A still further pipe member 33 approximately the same length as the door pan, has one end received in the T-section or joint 32 and its other end in a quick-release locking device 34 affixed to the inside upper wall panel of the enclosure 11.

The pipe framework 27 is preferably constructed with the vertical pipe members 28 and horizontal pipe members 31 formed into a unitary arrangement by the elbows 30 and T-joint 32 with nipples 29 being rotatatively affixed to the side walls 24 of the door pan. In this way, the entire unitary end frame can be laid down into the door pan during storage and, when needed, merely swung up into vertical position with final support provided by the member 33 inserted into T-joint 32 and locking device 34.

The pipe framework 27 serves as a support for flexible sheetlike members 35 constructed of plastic sheeting or canvas, for example, which forms a three-sided temporary wall arrangement enclosing the door pan during cleaning operation and preventing inadvertent dropping and overspray of cleaning materials used onto the area surrounding the cleaning apparatus. Thus, the length of the flexible members 35 is such as to form two side walls extending from the vertical pipe members 28 to the enclosure proper and across the full width of the wall 15 covering the opening of the enclosure 11. The upper and lower edge margins of the flexible sheeting 35 include a plurality of openings 36 through which is threaded a cordlike member 37 serving as a stiffener and means via which the flexible sheeting can slide to and fro as needed. The ends of the member 37 are temporarily affixed to the pipe members 28 adjacent their upper and lower ends, respectively. Releasable securing means 38, sometimes referred to as Velcro fasteners, permit rapid and secure fastening of the flexible sheeting 35 to the vertical pipes 28 by merely wrapping the sheeting about the pipe and pressing the members together. A pair of hooks 39 secured to the upper edge margins of members 35 cooperate with further hooks 40 on the interior walls of the enclosure 11 for securing the sheeting upright.

When the apparatus is not in use, pipe member 33 can be removed, the sheetlike members 35 taken off the frame and laid into the tray, with the end frame being either placed over or under the members 35, as desired. The established end member 21 is in that case folded back onto the end frame and members 35 as in FIG. 2.

The interior of the enclosure 11 includes a tank 41 within which a supply of water (or other suitable cleaning solution) is carried and a water heater (not shown) for raising the temperature of the water to a desired value. An electric motor and pump assembly 42 is interconnected with the tank 41 and includes a fixture 43 to which a length of hose 44 can be selectively connected. A spray nozzle 45 is interconnected with the outer end of the hose for developing a spray or stream of cleaning liquid as desired.

In the upper corner of the enclosure there are provided a plurality of filter units 46 which are interconnected with a storage tank 47 for the filtered liquid. An electrically driven pump 48 is mounted on the lower bottom wall within the enclosure and is operationally connected to the filter units 46. A length of flexible hose 49 (FIG. 3) has one end interconnected with the pump 48 and its other end received into the panlike region of the door 15 immediately adjacent the hinge 19. That is, in use it is contemplated that the pump 48 will remove cleaning liquid collected in the panlike part of the door 15 and pump it through the filter units 46 for storage in the tank 47. A foot treadle switch 50 is electrically interconnected with the pump motor for 48 enabling rapid and easy energization of the pump as needed.

An electric lighting assembly 51 is affixed to the inside surface of the top wall of the enclosure and is retractable into and out of the enclosure. The lighting structure is so arranged that when extended outwardly of the enclosure, it will direct light downwardly into the washing area as is shown in FIG. 3.

A framelike retainer 52 is secured to a side wall of the enclosure partially closing the open front. A gate 53 is hinged to the retainer and encloses the space between the retainer and opposite side wall of the enclosure. The gate and retainer serve as a limit stop for items being cleaned, as well as providing means for ready access to apparatus stored in the enclosure.

Figure 4:
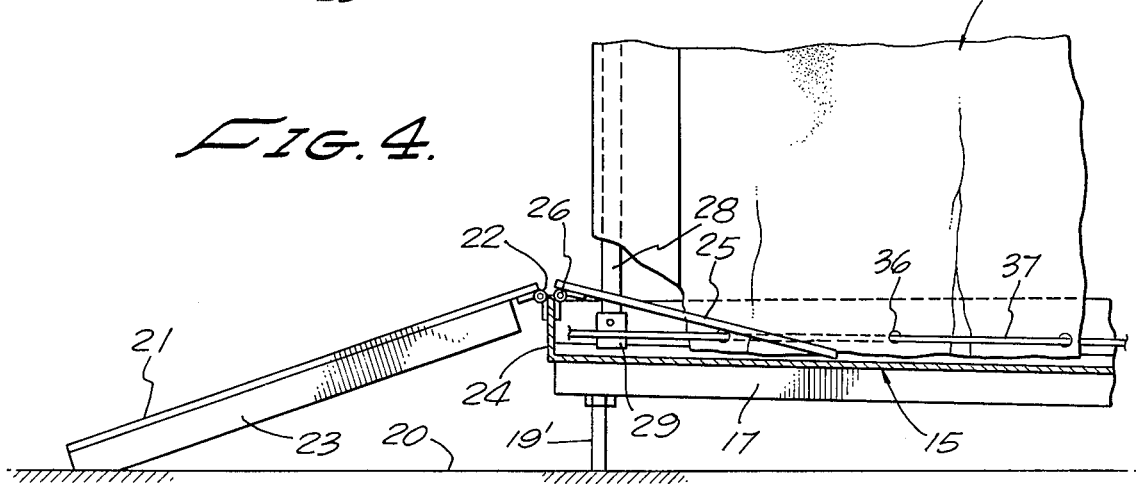
FIG. 4 is an elevational, sectional view of the outermost end of the cleaning tray or pan.

For the ensuing description of use of the cleaning apparatus, it will be assumed the apparatus is fully assembled as in FIG. 1 and located at a desired place of use. The first step is to unlock the door 15 and to swing it down into the position where it rests upon the ground plane 20 as is shown in FIG. 2. Then the extendible end member 21 is swung down to form the ramp as shown in FIGS. 3 and 4. The frame 27 is assembled with the flexible members 35 in place around three sides of the pan. If needed, the lighting assembly 51 may be extended and turned on.

The hand-operated spray nozzle 45 is then located near the open end of the washing area defined by the frame, pan and flexible wall members, and the article to be cleaned, such as a market basket, is moved via the ramps into the door pan. Finally, the spray is operated and the item is cleaned with all of the water, detergent, cleaning solvent or the like being contained entirely within the pan and the flexible sheetlike members 35 preventing the cleaning material from being deposited on the surrounding area. Also, as the cleaning solution begins to fill up the door pan from time to time, the foot treadle switch 50 is depressed which activates the pump 48 removing the cleaning fluid and transmitting it to the filters for revitalizing, recycling or storing for future use.

I claim:

1. Apparatus for washing shopping carts or the like, comprising in combination:
    a housing including top wall, bottom wall, back wall and two side walls forming an upstanding enclosure with an open side;
    a door pivotally interconnected to the housing bottom wall for swinging movement from a first position enclosing the housing open side to a second position resting on a substantially horizontal ground plane;
    pedestal means on the outwardly directed surface of the door for restingly supporting the outermost end of said door higher with respect to the ground plane than those parts of said door immediately adjacent the housing;
    upstanding side walls integrally related to the peripheral edges of said door forming an upwardly facing panlike means when said door rests on the ground plane in which panlike means shopping carts are received during washing;

tank means within said housing containing a supply of a cleaning liquid;

first pump means in said housing interconnected with said tank means for pressurizing the cleaning liquid therefrom;

filter and storage means located in said housing;

frame means removably mounted on said panlike means;

flexible sheetlike means mounted onto said frame means forming side walls and a back wall substantially covering said housing opening;

flexible hose and nozzle means interconnected with said first pump means for providing a pressurized supply of cleaning liquid into the panlike means for cleaning the shopping carts; and a second pumping means in communication with the panlike means and filter and storage means for moving cleaning liquid from said panlike means to said filter and storage means.

2. Apparatus as in claim 1, in which there are further provided first ramp means hinged to the outer end of the door and having parts resting on the ground plane, and second ramp means hinged to the outer end of the door and having parts resting on the upwardly directed door surface.

3. Apparatus as in claim 1, in which said second pumping means is under the selective control of a foot-treadle switch.

4. Apparatus as in claim 1, in which said frame means is constructed of a plurality of pipe means releasably interconnected via joint means enabling ready assembly and disassembly.

5. Apparatus as in claim 1, in which said flexible sheetlike means include a plurality of spaced openings arranged along opposite peripheral edge margins through which are threaded cordlike means.

6. Apparatus as in claim 1, in which lighting means are provided connected to said housing for directing light into the panlike means.

7. Apparatus as in claim 1, in which a wheeled support is provided for said housing.

8. Apparatus as in claim 1, in which the pedestal means is adjustable to position the door at correspondingly different heights from the ground plane.

* * * * *